United States Patent
Paul

(10) Patent No.: US 6,431,137 B1
(45) Date of Patent: Aug. 13, 2002

(54) CYLINDER HEAD ASSEMBLY FOR AN INTERNAL-COMBUSTION ENGINE

(75) Inventor: Michael Paul, Weissach (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/721,738

(22) Filed: Nov. 27, 2000

(30) Foreign Application Priority Data

Nov. 25, 1999 (DE) .......................................... 199 56 825

(51) Int. Cl.$^7$ ................................................. F02F 1/24
(52) U.S. Cl. ................................................... 123/193.5
(58) Field of Search ........................... 123/90.27, 193.5, 123/193.3, 195 R

(56) References Cited

U.S. PATENT DOCUMENTS

| | | | | |
|---|---|---|---|---|
| 4,773,360 A | * | 9/1988 | Heimburg ................ | 123/90.27 |
| 5,113,829 A | | 5/1992 | Motoyama | |
| 5,347,964 A | * | 9/1994 | Reguiero ................ | 123/90.27 |
| 5,379,743 A | | 1/1995 | Stokes et al. | |
| 5,611,301 A | * | 3/1997 | Gillbrand et al. ....... | 123/195 R |
| 5,868,113 A | * | 2/1999 | Yoshikawa ............... | 123/90.27 |
| 5,943,993 A | | 8/1999 | Carstensen et al. | |
| 6,083,140 A | * | 7/2000 | Kimura ................... | 123/90.27 |
| 6,279,529 B1 | * | 8/2001 | Komatsu et al. ......... | 123/193.5 |

FOREIGN PATENT DOCUMENTS

| | | |
|---|---|---|
| DE | 198 04 161 | 8/1998 |
| EP | 0 594 462 | 4/1994 |

* cited by examiner

Primary Examiner—Marguerite McMahon
(74) Attorney, Agent, or Firm—Crowell & Moring LLP

(57) ABSTRACT

A cylinder head for an internal combustion engine has inlet and outlet valves for the charge cycle control in a combustion space of the cylinder head, which inlet and outlet valves are actuated by at least one camshaft. For providing a cylinder head system having the inlet valves and the outlet valves which is suitable for different internal-combustion engines with a manifold injection or a direct injection, the head system has constructional characteristics which are suitable for a first cylinder head variant with a manifold injection as well as for a second cylinder head variant with a direct injection. The second cylinder head variant is provided with injection nozzles installed from a longitudinal side which extend at an acute angle with respect to a plane extending between the second cylinder head variant and a cylinder housing when assembled on a cylinder housing.

24 Claims, 2 Drawing Sheets

CYLINDER HEAD ASSEMBLY FOR AN INTERNAL-COMBUSTION ENGINE

BACKGROUND AND SUMMARY OF THE INVENTION

This application claims the priority of German Patent Document 199 56 825.1, filed Nov. 25, 1999, the disclosure of which is expressly incorporated by reference herein.

The invention relates to a cylinder head for an internal-combustion engine having inlet and outlet valves for the charge cycle control in a combustion space of the cylinder head, which valves are actuated at least one camshaft.

Internal-combustion engines of the Otto construction having a manifold injection or a direct injection have considerable development potentials, among others, with respect to exhaust gas emissions and fuel consumption. This may affect the manufacturers of these internal-combustion engine in that, in the future, they will use both injection systems for different types of internal-combustion engines—with a manifold injection or a direct injection—but, for example, with the same number of cylinders.

An internal-combustion engine is known from European Patent Document EP 0 594462 A1 (corresponding to U.S. Pat. No. 5,379,743) which operates by means of a manifold injection. Here, an injection nozzle is provided in an intake pipe which leads to an inlet valve and a combustion space.

From German Patent Document DE 19804 161 A1, an internal-combustion with a direct injection is known which comprises an injection nozzle leading into a combustion space. The combustion space is formed by a profiled piston head and a gable-roof-type ceiling of a cylinder head. The cylinder head is provided with inlet and outlet valves arranged in a V-shape and with a central spark plug extending between the latter.

It is an object of the invention to design a cylinder head such that, while constructional realities are taken into account, it will be suitable for different internal-combustion engines with a manifold injection or a direct injection.

According to the invention, this object is achieved by providing a cylinder head for an internal-combustion engine having inlet and outlet valves for the charge cycle control in a combustion space of the cylinder head, which valves are actuated by at least one camshaft, wherein a cylinder head system comprising inlet valves and outlet valves has constructional characteristics which are suitable for a first cylinder head variant with a manifold injection as well as for a second cylinder head variant with a direct injection such that at least the constructional characteristics valve angle of the first cylinder head variant and of the second cylinder head variant correspond to one another, the second cylinder head variant being provided with at least one injection nozzle installed from a longitudinal side of the second cylinder head variant, each of the at least one injection nozzle extending at an acute angle with respect to a plane extending between the second cylinder head variant and a cylinder housing when in an assembled in use position.

Additional advantageous features of preferred embodiments of the invention are described below and in the claims.

Principal advantages achieved by the invention are the fact that, because of concurring construction characteristics, the first cylinder head variant and the second cylinder head variant are produced by identical manufacturing and mounting devices, which has a cost reducing effect. Thus, it is possible that one and the same manufacturer of internal-combustion engines presents a basic design of an internal-combustion engine, for example, with a crankcase having six cylinders. On the above-mentioned crankcase, the first cylinder head variant or the second cylinder head variant is mounted according to the type of injection—manifold injection or direct injection. Furthermore, in the case of both cylinder head variants, identical and/or proven design principles for the outlet and inlet ducts, the cooling water ducts, and the valve angles can be provided. It is also contemplated to use for this cylinder head variant identical parts such as bucket tappets, valve guides or the like. Finally, the second cylinder head variant can be constructed in a simple manner if it is tilted with respect to the first cylinder head variant over a first longitudinal side by a defined amount and the injection valves are mounted on the second longitudinal side.

Other objects, advantages and novel features of the present invention will become apparent from the following detailed description of the invention when considered in conjunction with the accompanying drawings.

DETAILED DESCRIPTION OF THE DRAWINGS

Figure 1:
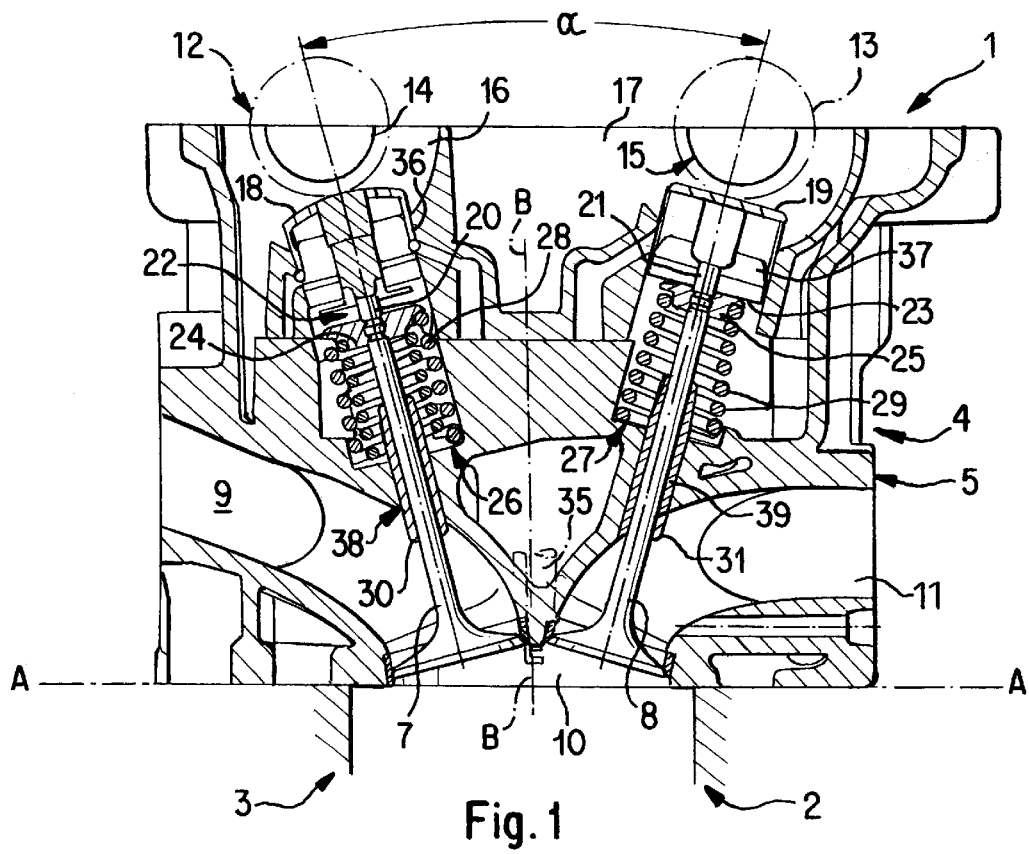
FIG. 1 is a partial cross-sectional view of an internal-combustion engine in the area of a first cylinder head variant, constructed according to a preferred embodiment of the invention.

In the illustrated area, an internal-combustion engine 1 of the Otto construction comprises a cylinder housing 2 with at least one cylinder 3 in which a piston, which is not shown, carries out stroke movements. A cylinder head system 4 is connected with the cylinder housing 2, both being assembled along a connecting plane A—A. The cylinder head system 4 has constructional characteristics which are suitable for a first cylinder head variant 5 with a manifold injection as well as for a second cylinder head variant 6 with a direct injection.

The first cylinder head variant 5 has at least one inlet valve 7 and one outlet valve 8 for each cylinder, which valves enclose a valve angle $\alpha$. The inlet valve 7 controls a fuel-air mixture to be guided to a combustion space 10 by way of an intake port 9, fuel being sprayed into the intake port 9 by an injection nozzle which is not shown. Exhaust gases generated in the combustion space 10 are removed by the outlet valve 8 and an exhaust port 11. The inlet valve 7 and the outlet valve 8 are actuated by camshafts 12, 13. Between the camshafts 12, 13, received in bearing bores 14, 15 of bearing blocks 16, 17 of the first cylinder head variant 5 and the inlet valve 7 as well as the outlet valve 8, bucket tappets 18, 19 are provided which interact with valve stems 20, 21 of the inlet valve 7 and the outlet valve 8. Spring plates 24, 25 are mounted on the ends 22, 23 of the valve stems 20, 21. Between the spring plates 24, 25 and stops 26, 27 of the first cylinder head variant 5, valve springs 28, 29 are operative which act to move the inlet valve 7 and the outlet valve 8 into end positions. In this case, their valve stems 20, 21 are surrounded by valve guides 30, 31 which are fixed in the first cylinder head variant 5.

Figure 2:
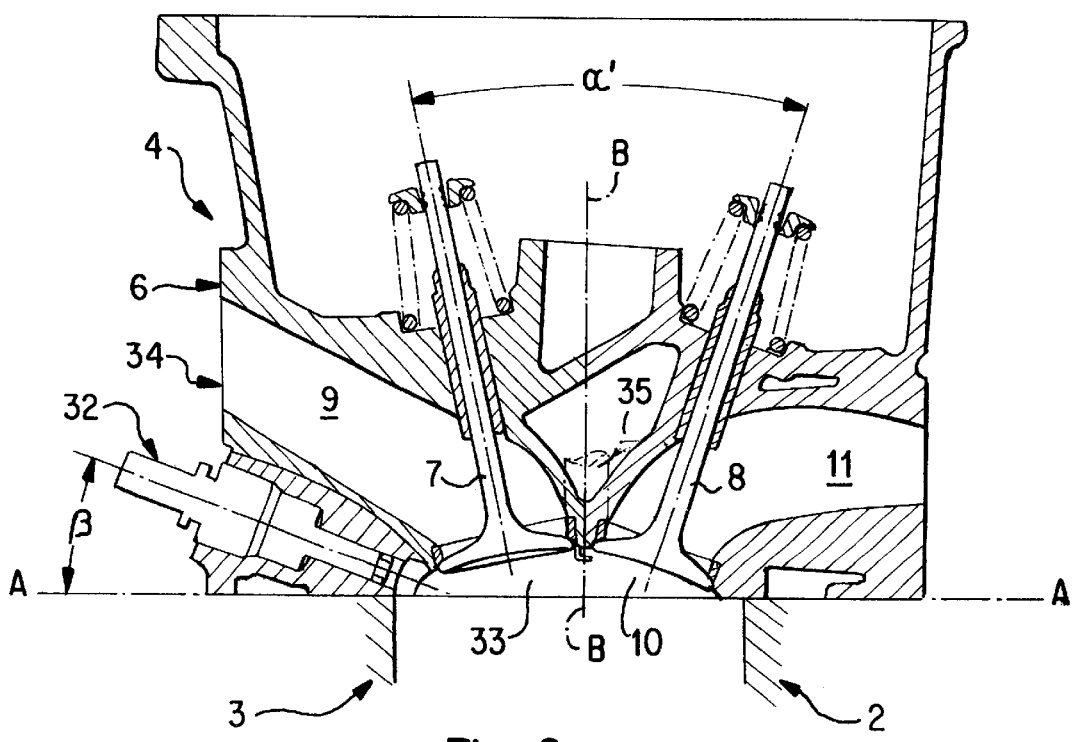
FIG. 2 is a view corresponding to FIG. 1 showing a second cylinder head variant constructed according to a preferred embodiment of the invention.

FIG. 2 shows the second cylinder head variant 6 which is constructed for a direct injection. Irrespective of the different injection systems, the first cylinder head variant 5 and the second cylinder head variant 7 have similar design characteristics. Thus, the valve angle α of the first cylinder head variant 5 corresponds to the valve angle α' of the second cylinder head variant 6. In addition, the second cylinder head variant 6 has one or several injection nozzles 32 which lead directly into a combustion space 33 and are installed from an upright longitudinal side 34 of the above-mentioned second cylinder head variant 6. The injection nozzles 32 extend at an acute angle β with respect to the plane A—A.

The fuel-air mixture fed into the combustion space 10 or 33 is ignited by a spark plug 35 which extends between the inlet valve 7 and the outlet valve 8, specifically in the same direction as a longitudinal center plane B—B of the cylinder 3 such that the spark plug 35 takes up a central position in the combustion space 10 or 33. These constructional characteristics are provided in the first cylinder head variant 5 as well as in the second cylinder head variant 6 in an identical or similar form. Analogously, this applies to the constructional characteristics of the bearing bores 14, 15 in the bearing blocks 16, 17, the bores 36, 37 of the bucket tappets 18, 19, the bores 38, 39 of the valve guides 30, 31 or the like. These measures permit the use of a number of components—bucket tappets, valve guides—as identical parts in the first cylinder head variant 5 and in the second cylinder head variant 6.

Figure 3:
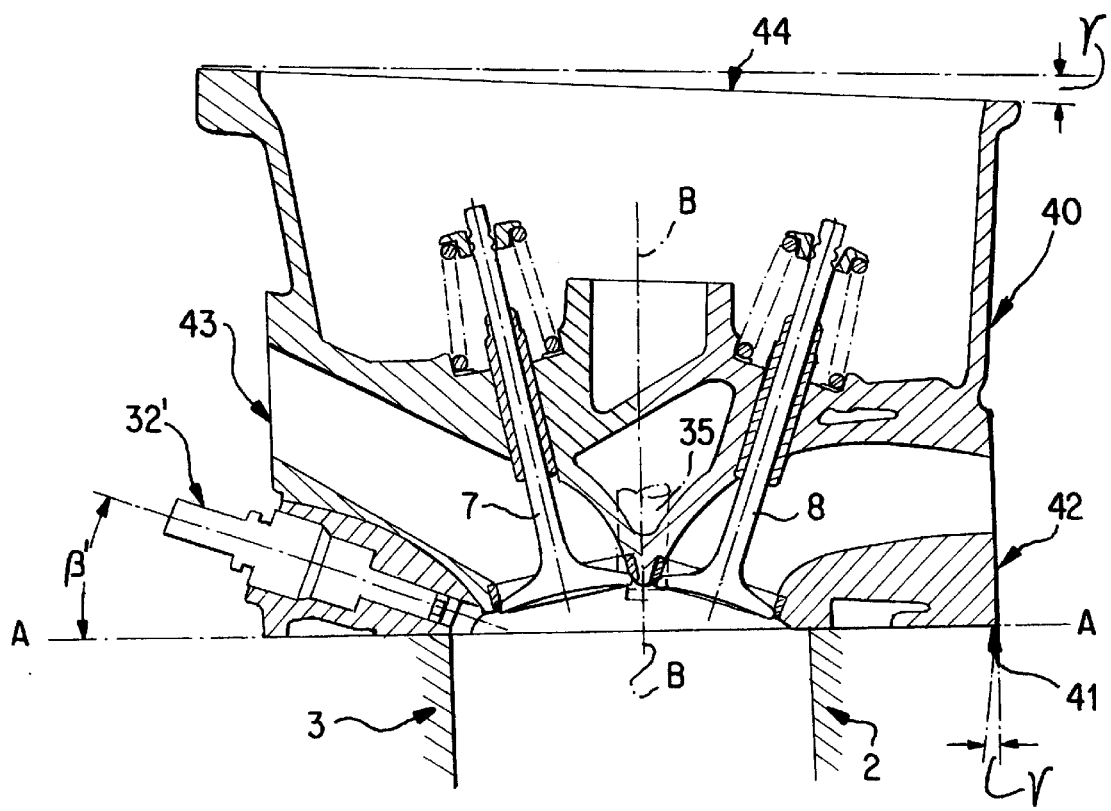
FIG. 3 is a view corresponding to FIG. 1 showing another second cylinder head variant constructed according to a preferred embodiment of the invention.

According to FIG. 3, the second cylinder head variant 40 is tilted by an angle y with respect to a base edge 41 of a first longitudinal side 42 which rests on the plane A—A, and the injection nozzles 32' are provided on the opposite longitudinal side 43 of the second cylinder head variant 40 (angle β' indicating inclination with respect to a line perpendicular to the plane A—A). These injection nozzles 32' extend relatively closely to the connecting plane A—A and extend at an acute angle β' to that plane. In this embodiment, a side 44 situated opposite the plane A—A is constructed as an inclined plane inclined at same angle γ with respect to horizontal plane parallel to plane A—A which results from the tilting over the base edge 41.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cylinder head assembly for internal-combustion engines comprising:
    a first cylinder head variant for manifold injection engine operations which includes inlet and outlet valve assemblies extending at a first predetermined angle with respect to one another, and
    a second cylinder head variant for direct injection engine operations which includes inlet and outlet valve assemblies extending at the first predetermined angle with respect to one another,
    said first and second cylinder head variants having common design characteristics so they can be selectively usable with similar cylinder blocks to thereby facilitate design and manufacture of respective different engines with either manifold injection or direct injection.
2. Cylinder head assembly according to claim 1, wherein said common design characteristics include a similar location of at least one spark plug between the inlet valves and the outlet valves for the first and second cylinder head variants.
3. Cylinder head assembly according to claim 1, wherein said common design characteristics include similar bearing bores in bearing blocks for camshafts in the first and second cylinder heard variants.
4. Cylinder head assembly according to claim 1, wherein said common design characteristics include similar bores for bucket tappets in the first and second cylinder head variants.
5. Cylinder head assembly according to claim 1, wherein said common design characteristics include similar bores for valve guides in the first and second cylinder head variants.
6. Cylinder head assembly according to claim 3, wherein said common design characteristics include similar bores for bucket tappets in the first and second cylinder head variants.
7. Cylinder head assembly according to claim 3, wherein said common design characteristics include similar bores for valve guides in the first and second cylinder head variants.
8. Cylinder head assembly according to claim 6, wherein said common design characteristics include similar bores for valve guides in the first and second cylinder head variants.
9. Cylinder head assembly according to claim 4, wherein said common design characteristics include identical bucket tappets for the first and second cylinder head variants.
10. Cylinder head assembly according to claim 5, wherein said common design characteristics include identical valve guides for the first and second cylinder head variants.
11. Cylinder head assembly according to claim 1, wherein the second cylinder head variant is tilted over a base edge of a first longitudinal side of the second cylinder head variant, which base edge rests on a plane, the injection nozzles being provided on an opposite second longitudinal side of the second cylinder head variant.
12. Cylinder head assembly according to claim 11, wherein the side of the second cylinder head variant situated away from the plane is constructed as an inclined plane.
13. Cylinder head assembly according to claim 1, wherein each cylinder head variant is configured for a plurality of engine cylinders.
14. Cylinder head assembly according to claim 13, wherein each cylinder head variant is configured for six engine cylinders arranged and aligned in a row.
15. A method of making two different types of combustion engines having respective different injection systems, a first engine type having a manifold injection system and a second engine type having a direct injection, said method comprising:
    making a first cylinder head variant for manifold injection engine operations which includes inlet and outlet valve assemblies extending at a first predetermined angle with respect to one another, and
    making a second cylinder head variant for direct injection engine operations which includes inlet and outlet valve assemblies extending at the first predetermined angle with respect to one another,
    making a common cylinder block, and
    selectively attaching one of the first and second cylinder head variants to the common cylinder block to form cylinder head and cylinder block assemblies for the respective first and second engine types.
16. A method according to claim 15,
    wherein the second cylinder head variant is provided with at least one injection nozzle installed from a longitudinal side of the second cylinder head variant, each of the at least one injection nozzle extending at an acute angle with respect to a connecting plane between the second cylinder head variant and the cylinder block when in an assembled in use position.

17. A method according to claim 15,
wherein the constructional characteristics central position of each of at least one spark plug between the inlet valves and the outlet valves of the first cylinder head variant and the second cylinder head variant are similar to one another.

18. A method according to claim 16,
wherein the constructional characteristics central position of each of at least one spark plug between the inlet valves and the outlet valves of the first cylinder head variant and the second cylinder head variant are similar to one another.

19. A method according to claim 15,
wherein the constructional characteristics of bearing bores in bearing blocks for camshafts, of bores for bucket tappets, and of bores for valve guides or the like of the first cylinder head variant and the second cylinder head variant are similar to one another.

20. A method according to claim 19,
wherein bucket tappets, valve guides or the like for the first cylinder head variant and the second cylinder head variant are identical parts.

21. A method according to claim 15,
wherein the second cylinder head variant is tilted over a base edge of a first longitudinal side of the second cylinder head variant, which base edge rests on a connecting plane when connected to a cylinder block, the injection nozzles being provided on an opposite second longitudinal side of the second cylinder head variant.

22. A method according to claim 21,
wherein the side of the second cylinder head variant situated away from the plane is constructed as an inclined plane.

23. A method according to claim 15,
wherein each cylinder head variant is configured for a plurality of engine cylinders.

24. A method according to claim 15,
wherein each cylinder head variant is configured for six aligned engine cylinders.

* * * * *